(12) United States Patent
Dickie et al.

(10) Patent No.: US 10,977,276 B2
(45) Date of Patent: Apr. 13, 2021

(54) BALANCED PARTITION PLACEMENT IN DISTRIBUTED DATABASES

(71) Applicant: International Business Machines Corporation, Armonk, NY (US)

(72) Inventors: Garth A. Dickie, Framingham, MA (US); Amina Shabbeer, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 14/815,464

(22) Filed: Jul. 31, 2015

(65) Prior Publication Data
US 2017/0032014 A1 Feb. 2, 2017

(51) Int. Cl.
G06F 16/27 (2019.01)

(52) U.S. Cl.
CPC .................. *G06F 16/278* (2019.01)

(58) Field of Classification Search
CPC .................. G06F 17/30584; G06F 16/278
USPC .......................................................... 707/620
See application file for complete search history.

(56) References Cited

U.S. PATENT DOCUMENTS

| | | | | |
|---|---|---|---|---|
| 5,440,727 A * | 8/1995 | Bhide | .................. | G06F 16/273 711/117 |
| 7,685,109 B1 * | 3/2010 | Ransil | .................. | G06F 16/245 707/999.003 |
| 7,937,545 B1 * | 5/2011 | Wu | ...................... | G06F 11/1469 711/162 |
| 7,984,043 B1 * | 7/2011 | Waas | ................... | G06F 16/8358 707/718 |
| 8,447,757 B1 * | 5/2013 | Cox | ..................... | G06F 16/2471 707/720 |
| 8,522,290 B2 | 8/2013 | Chakrabarti et al. | | |
| 8,560,639 B2 | 10/2013 | Murphy et al. | | |
| 8,612,330 B1 * | 12/2013 | Certain | ..................... | G06F 9/50 705/37 |
| 8,694,400 B1 * | 4/2014 | Certain | .................. | G06Q 30/08 705/35 |
| 8,949,188 B2 * | 2/2015 | Pafumi | ............... | G06F 11/1464 707/640 |
| 9,053,167 B1 * | 6/2015 | Swift | ...................... | G06F 16/27 |
| 9,235,611 B1 * | 1/2016 | Murray | ................ | G06F 16/278 |
| 9,367,560 B1 * | 6/2016 | Ely | ......................... | G06F 16/27 |
| 9,471,657 B1 * | 10/2016 | Xiao | ....................... | G06F 16/27 |
| 9,602,590 B1 * | 3/2017 | Lu | .......................... | G06F 9/5061 |
| 9,633,051 B1 * | 4/2017 | Maccanti | ............ | G06F 11/1464 |
| 9,639,589 B1 * | 5/2017 | Theimer | ............. | G06F 11/1453 |
| 9,800,575 B1 * | 10/2017 | Lewis | ................... | H04L 9/3234 |
| 9,860,314 B2 * | 1/2018 | Kore | .................... | H04L 67/1095 |

(Continued)

*Primary Examiner* — Mark E Hershley
(74) *Attorney, Agent, or Firm* — Robert C. Bunker

(57) ABSTRACT

For balanced partition placement in a distributed database, a first node in a set of nodes is identified, at an application executing using a processor and a memory, for a first primary partition of the distributed database, such that the primary partition and a first replica corresponding to the primary partition reside on different nodes in the set of nodes. A second node in the set of nodes is selected to place the first replica such that the second node does not include a second replica of a second primary partition, wherein the first primary partition and the second primary partition are co-resident on the first node. The first primary partition is placed on the first node and the first replica is placed on the second node.

17 Claims, 9 Drawing Sheets

(56) References Cited

U.S. PATENT DOCUMENTS

| | | | |
|---|---|---|---|
| 10,025,673 B1* | 7/2018 | Maccanti | G06F 11/1451 |
| 2003/0126309 A1* | 7/2003 | Camble | G06F 21/78 |
| | | | 719/321 |
| 2005/0159927 A1* | 7/2005 | Cruz | G06F 11/0748 |
| | | | 702/188 |
| 2006/0190243 A1* | 8/2006 | Barkai | G06F 16/278 |
| | | | 704/8 |
| 2007/0164168 A1* | 7/2007 | Hirvonen | B64C 13/04 |
| | | | 244/223 |
| 2007/0168336 A1* | 7/2007 | Ransil | G06F 16/958 |
| 2007/0294319 A1* | 12/2007 | Mankad | G06F 11/1662 |
| 2008/0126833 A1* | 5/2008 | Callaway | G06F 11/1446 |
| | | | 714/6.1 |
| 2009/0012932 A1* | 1/2009 | Romem | G06F 16/2282 |
| 2009/0089313 A1* | 4/2009 | Cooper | G06F 16/217 |
| 2010/0106813 A1* | 4/2010 | Voutilainen | G06F 16/27 |
| | | | 709/221 |
| 2010/0114826 A1* | 5/2010 | Voutilainen | H04L 67/1095 |
| | | | 707/638 |
| 2010/0293334 A1* | 11/2010 | Xun | G06F 16/9014 |
| | | | 711/129 |
| 2011/0208719 A1* | 8/2011 | Betawadkar-Norwood | |
| | | | G06F 16/2471 |
| | | | 707/714 |
| 2011/0276649 A1* | 11/2011 | Pujol | G06Q 10/10 |
| | | | 709/208 |
| 2012/0233117 A1* | 9/2012 | Holt | G06F 16/1748 |
| | | | 707/620 |
| 2012/0290714 A1 | 11/2012 | Cohen | |
| 2012/0331335 A1* | 12/2012 | Judin | G06F 11/1658 |
| | | | 714/4.11 |
| 2013/0290249 A1* | 10/2013 | Merriman | G06F 16/273 |
| | | | 707/610 |
| 2014/0122433 A1* | 5/2014 | Murata | G06F 11/1458 |
| | | | 707/640 |
| 2014/0129521 A1* | 5/2014 | Marsden | H04W 4/90 |
| | | | 707/623 |
| 2014/0279902 A1* | 9/2014 | Hattori | G06F 16/27 |
| | | | 707/634 |
| 2014/0358972 A1* | 12/2014 | Guarrieri | G06F 21/6227 |
| | | | 707/781 |
| 2015/0277974 A1* | 10/2015 | Beale | G06F 9/5088 |
| | | | 714/19 |
| 2015/0333994 A1* | 11/2015 | Gell | G06F 3/067 |
| | | | 709/224 |
| 2015/0350324 A1* | 12/2015 | Hu | H04L 67/1031 |
| | | | 709/219 |
| 2015/0370651 A1* | 12/2015 | Gaza | G06F 11/1469 |
| | | | 707/652 |
| 2016/0004571 A1* | 1/2016 | Smith | G06F 16/278 |
| | | | 718/105 |
| 2016/0057219 A1* | 2/2016 | Kore | H04L 67/1097 |
| | | | 709/248 |
| 2016/0092540 A1* | 3/2016 | Bihani | G06F 16/256 |
| | | | 707/624 |
| 2016/0171072 A1* | 6/2016 | Jagtiani | G06F 16/273 |
| | | | 707/613 |
| 2016/0179642 A1* | 6/2016 | Cai | G06F 9/5083 |
| | | | 714/4.12 |
| 2016/0357648 A1* | 12/2016 | Keremane | G06F 11/2058 |
| 2018/0314749 A1* | 11/2018 | Raja | G06F 16/278 |

\* cited by examiner

BALANCED PARTITION PLACEMENT IN DISTRIBUTED DATABASES

TECHNICAL FIELD

The present invention relates generally to a method, system, and computer program product for operating a distributed database or a massively parallel processing (MPP) data warehouse. More particularly, the present invention relates to a method, system, and computer program product for balanced partition placement in distributed databases.

BACKGROUND

A distributed data processing environment includes several data processing systems that are configured and operated to share the workload of the data processing environment. In case of a distributed database, the database is divided into partitions and various data processing systems in the distributed environment serve those partitions.

A high availability (HA) system is a data processing system configured to ensure a threshold level of operational continuity during a given period. Availability refers to the ability of the users and applications to access the data processing system, whether to submit new work, update or alter existing work, or collect the results of previous work. If a user or application cannot access the system, the system is said to be unavailable. Generally, the term downtime is used to refer to periods when a system is unavailable. HA systems are often employed in business organizations to deliver business critical applications and services. A distributed database is configured for higher availability, improved reliability, and better performance as compared to single instance monolithic databases. A database distributed across multiple data processing systems, an MPP database, an MPP data warehouse, and other variations thereof are collectively referred to herein as a distributed database.

Data distribution in distributed databases is critical in providing availability and performance guarantees through component failures and system expansion. Commodity-type data processing system hardware fails frequently, causing nodes that host a database partition to become unavailable.

Replication techniques have been widely used in distributed databases to provide fault tolerance. Essentially, replication creates one or more copies of a partition. The partition and a replica of the partition are preferably stored on different nodes. When a node serving the partition becomes unavailable, such as due to a failure, shutdown, or disconnection, another node that is maintaining a replica of the partition takes over the serving of the partition.

Expansion of a distributed database environment is also a difficult problem. For example, presently, when a new node is added, the database has to be redistributed over all available nodes, causing a significant amount of network traffic during the redistribution. When the expansion adds a larger capacity node, some presently used configurations simply copy over the data from a node to the larger node, again creating a significant amount of network traffic.

SUMMARY

The illustrative embodiments provide a method, system, and computer program product for balanced partition placement in distributed databases. An embodiment includes a method for balanced partition placement in a distributed database. The embodiment identifies, at an application executing using a processor and a memory, a first node in a set of nodes for a first primary partition of the distributed database, such that the primary partition and a first replica corresponding to the primary partition reside on different nodes in the set of nodes. The embodiment selects a second node in the set of nodes to place the first replica such that the second node does not include a second replica of a second primary partition, wherein the first primary partition and the second primary partition are co-resident on the first node. The embodiment places the first primary partition on the first node and the first replica on the second node.

Another embodiment includes a computer usable program product comprising a computer readable storage device including computer usable code for balanced partition placement in a distributed database.

Another embodiment includes a data processing system for balanced partition placement in a distributed database.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
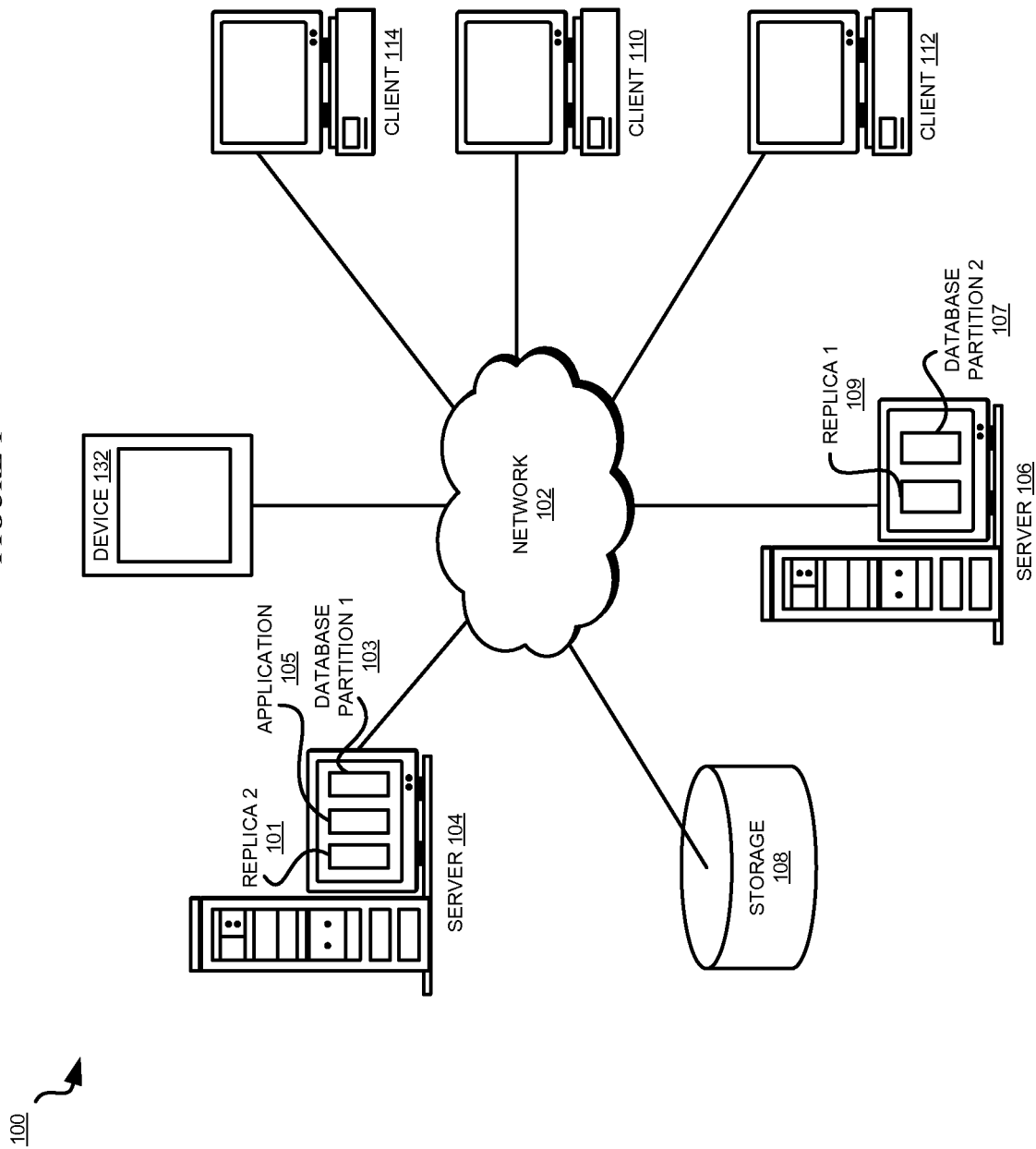
FIG. 1 depicts a block diagram of a network of data processing systems in which illustrative embodiments may be implemented.

A partition that is actively serving a portion of a distributed database is also referred to herein as a primary or a primary partition. A replica of a primary partition—also referred to herein as a replica partition—is a current copy of the data and state of the primary partition. Thus, a primary and a corresponding replica are each a copy of the portion of a distributed database.

A node is a data processing system that hosts a partition—whether serving a primary or maintaining a replica. A node belongs to a cluster. A cluster can span all or part of a rack in a datacenter or more than one rack in one or more data centers. Any number of clusters can exist in this manner, including any number of nodes, spanning any number of racks, across any number of data centers. Consequently, a distributed database can be distributed across different nodes of one cluster, different nodes of different clusters, nodes in one rack, nodes across different racks, nodes in one datacenter, nodes across different data centers, or some combination thereof.

The illustrative embodiments recognize that determining the nodes on which the primary and the corresponding replicas should be placed to satisfy performance and availability requirements is a challenge in distributed databases. Preserving locality, i.e., processing a database partition on the node where the partition is stored locally is a significant factor in determining database performance. Using current techniques, recovery from a node failure by activating replicas of the primaries that were operating on the failed node is undesirably slow. During the recovery time, database performance as a whole, or at least the performance of an affected partition is undesirably reduced.

The illustrative embodiments further recognize that the possibility of concurrent failures of multiple nodes within a failure zone, such as due to a common rack outage, further complicate the recovery process in the presently used recovery methods. It is not uncommon for a recovery process to take several hours, which is highly undesirable in distributed databases.

The illustrative embodiments further recognize that distributing partitions to available nodes is a complex utilization problem as well. It is quite likely different nodes have different amounts of computing resources available to them. Therefore, not all nodes can host all partitions effectively, perform within the desired performance parameters with certain partitions, or operate with the desired degree of reliability with all partitions.

Some prior art methods, e.g. consistent hashing, have the separation of partitions and replicas as a goal, but such methods cannot guarantee the separation because those methods essentially rely on randomized distribution of partitions. The illustrative embodiments recognize that in the context of MPP, the number of possible undesirable configurations is many orders of magnitude greater than the desirable configurations. Therefore, relying on randomization to achieve separation of partitions and replicas is not a practical solution. The illustrative embodiments recognize that strict satisfaction of a set of conditions is required to achieve the performance and HA benefits described herein.

Placing a partition on a node requires not only partition-specific operational considerations but also node-specific operational considerations, such as reserve capacity remaining at the node after the partition placement, or a utilization of the node exceeding a threshold utilization as a result of the partition placement. Thus, the illustrative embodiments recognize that for distributed database systems, there is a need for a method for wide distribution of replicas across the cluster to speed the recovery and minimize the effect of failures while preserving data locality and uniform load-distribution.

The illustrative embodiments recognize that these considerations are also useful for smooth system expansion, i.e., addition of nodes to satisfy increasing demand for storage and other computing resources. Currently available methods cause severe performance degradation during node-bootstrap, to wit, expansion by addition of nodes—in massively parallel, input/output (I/O) intensive clusters, as in the case of distributed databases.

The illustrative embodiments recognize that to keep network traffic and I/O minimal during failure recovery or expansion operations, the number of partitions that should be moved should be minimized. Additionally, the illustrative embodiments also recognize that post-node-failure, one or more surviving nodes should preferably each take on only a fraction of the load from the failed node, to avoid significant reduction in performance.

The illustrative embodiments used to describe the invention generally address and solve the above-described problems and other problems related to managing distributed database partitions. The illustrative embodiments provide a method, system, and computer program product for balanced partition placement in distributed databases.

An embodiment executes as an application in, or in conjunction with, a data processing system used for administrating a distributed database. In some cases, an embodiment may execute on a node that is hosting a partition of the distributed database. In other cases, an embodiment may execute on a system that does not host a partition but performs a management function relative to the distributed database.

An embodiment solves an initial placement problem. The embodiment provides and evaluates a set of conditions that should be satisfied for initially placing various primaries and replicas on various nodes. For example, suppose that a particular database is configured to operate with two replicas of each primary. As one example condition on the placement, the embodiment ascertains that a replica is placed on a node other than the node where the primary is placed. The nodes can be in the same or different clusters, same or different racks, same or different data centers, or a combination thereof, as an implementation may desire.

As another example condition on the placement, the embodiment ascertains that different replicas are placed on different nodes. Again, the nodes can be situated anywhere without limitation within the scope of the illustrative embodiments.

As another example condition on the placement, the embodiment ascertains that the placement of a copy (whether primary or a replica) on a node does not cause a utilization of that node to exceed a threshold utilization set for that node. For example, different nodes can have different resource reserves requirements, which translate into different amounts of resources that can be utilized by operations at that node, thereby setting the threshold utilization for that node.

As another example condition on the placement, the embodiment ascertains that when a copy (whether primary or a replica) can be placed on any of the several alternative nodes, the copy is placed on that alternative node whose utilization will increase by the least amount as a result of the placement while maintaining that node's reserves requirements.

As another example condition on the placement, the embodiment ascertains that when two or more primaries are co-resident or co-hosted on a common node, their replicas are not also co-resident on another node, if possible, given the nodes in the configuration. When the node availability in a given configuration necessitates that some replicas of co-resident primaries have to be co-resident at another node, the condition ascertains that a number of co-resident replicas of the co-resident primaries is minimized in the configuration.

Another embodiment solves a recovery placement problem. The embodiment provides and evaluates a set of conditions that should be satisfied for placing various primaries and replicas on various nodes in a recovery operation after a failure or removal of a node that was hosting a partition. As an example, when a node that was hosting a primary fails, a replica of the primary has to be activated on another node. When several replicas corresponding to the failed primary are available for activation, the embodiment ascertains that the replica that causes the utilization of its node by the least amount while maintaining that node's reserves requirements is activated.

Another embodiment solves a redistribution placement problem. The embodiment provides and evaluates a set of conditions that should be satisfied for changing the placing of certain primaries and replicas on various nodes when a previous placement solution has to be changed, such as due to a change in node conditions, preferences, performance requirements, and other reasons. As an example, the embodiment ascertains that when a primary can be placed on any of the several alternative nodes, the copy is placed on that alternative node whose utilization will increase by the least amount as a result of the placement while maintaining that node's reserves requirements.

The new configuration must continue to satisfy the original set of conditions such that the new configuration remains amenable to future changes due to failure or expansion. Note that redistribution may also be performed in two steps, (1) Processes are migrated to nodes where partition copies are locally present, and (2) Replicas are regenerated in locations that satisfy the original set of conditions on the existing set of nodes. Alternatively, a new node may be added after failover step (1) and the steps described herein with respect to expansion may be followed to redistribute partitions and copies in a balanced way.

Another embodiment solves an expansion placement problem. The embodiment provides and evaluates a set of conditions that should be satisfied for changing the placing of certain primaries and replicas on various nodes when a new node is made available for use with the distributed database. As an example, the embodiment ascertains that a primary is either moved from an existing node to the new node or not moved at all, avoiding any moves of a primary from one existing node to another existing node.

Furthermore, the embodiment performs the move of a primary to the new node in two steps. First, the embodiment creates a replica of the primary on the new node. Next, when the replica is ready on the new node, the embodiment promotes the replica to a primary state and demotes the existing primary to a replica state. Thus, the embodiment moves the primary to the new node with minimal service disruption or adverse affect on the partition's performance.

Note that the various example conditions are described with respect to certain operations and embodiments only as examples and not with an intent to limit those conditions to those embodiments or operations. From this disclosure, those of ordinary skill in the art will be able to conceive additional conditions for similar purposes, use these and other conditions with any embodiment described herein, and such adaptations are contemplated within the scope of the illustrative embodiments.

A method of an embodiment described herein, when implemented to execute on a device or data processing system, comprises substantial advancement of the functionality of that device or data processing system for balanced partition placement in distributed databases. For example, prior-art method of placing and moving distributed database partitions causes some nodes to take on more load from a failed node than others causing a resource crunch and performance degradation at those nodes. An embodiment distributes the partitions across the available nodes subject to a set of conditions that ensure minimal performance impact from the placement, activation, or movement of partitions. Such manner of balanced partition placement in distributed databases is unavailable in presently available devices or data processing systems. Thus, a substantial advancement of such devices or data processing systems by executing a method of an embodiment is in reducing the time and effort of failure recovery, improvement of overall database performance, minimization of performance degradation due to failures or transitions, and smoother expansion of the configuration for serving distributed databases.

The illustrative embodiments are described with respect to certain nodes, clusters, racks, data centers, computing resources, partitions, numbers of replicas, conditions, databases, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
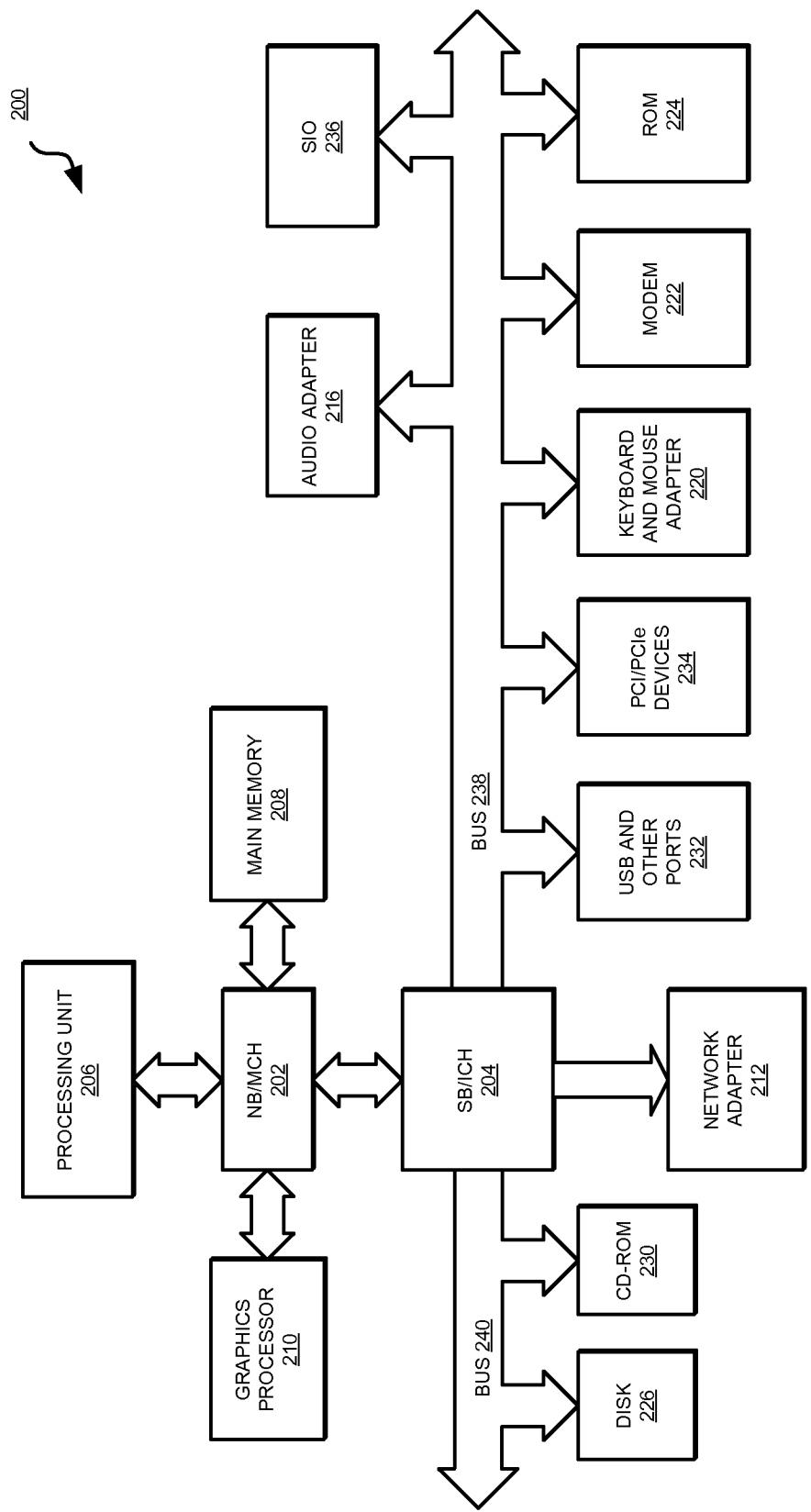
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. The depicted network of computers can be configured to operate within a single rack, across different racks in a datacenter, or across different data centers. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Assume as a non-limiting example that an embodiment is implemented in a node that also serves a partition. Server 104 is such a node and serves database partition 1 (103), which is a primary partition of a distributed database. Application 105 implements an embodiment described herein. Server 106 is another node, which serves database partition 2 (107), which is another primary partition of the distributed database. Server 104 hosts replica 2 (101), which is a replica of partition 2 (107). Server 106 hosts replica 1 (109), which is a replica of partition 1 (103).

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the C++, Python, Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates. Python is a trademark of Python Software Foundation).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
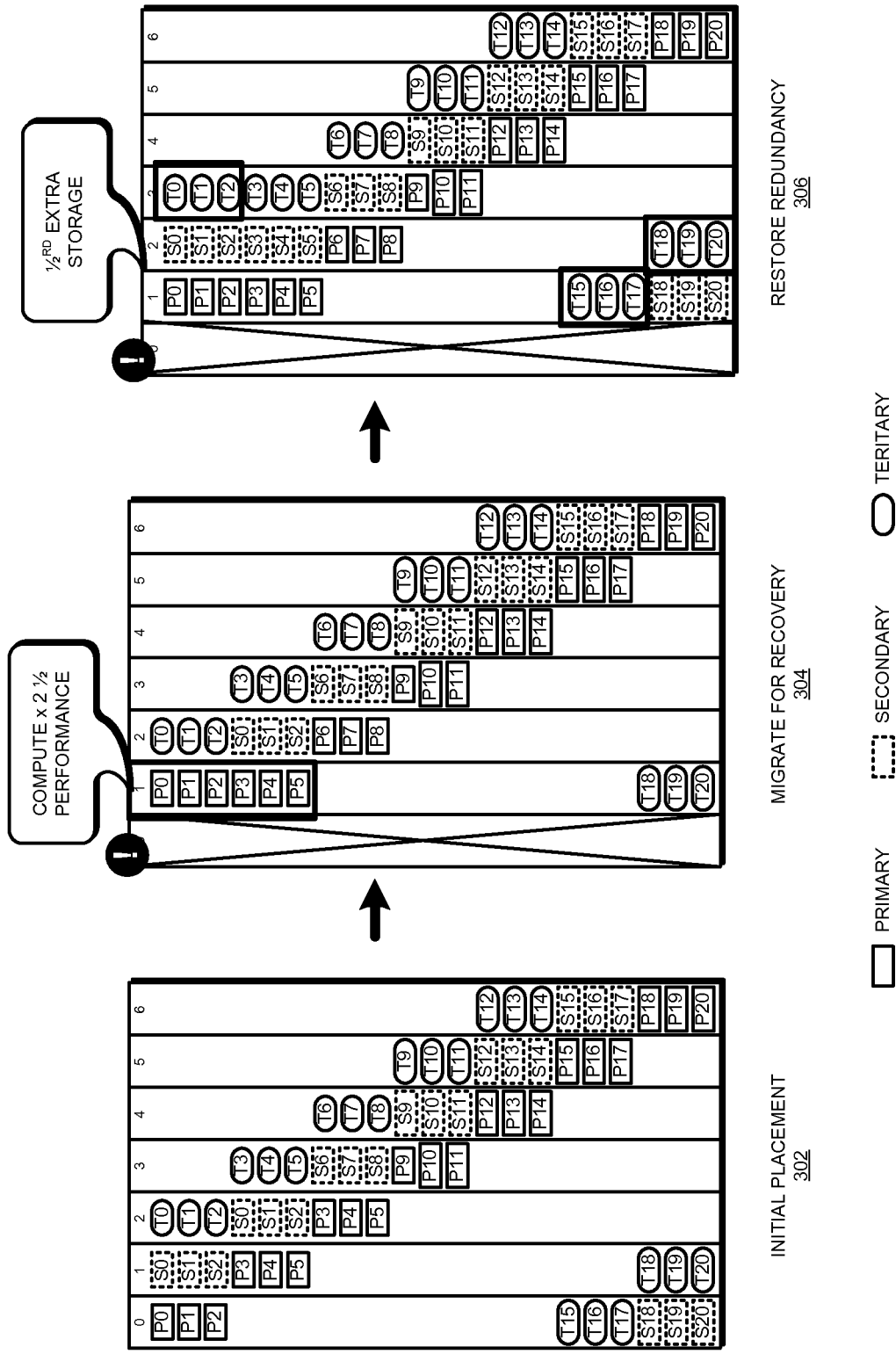
FIG. 3 depicts a block diagram of an example partition placement in presently used distributed databases that can be improved in accordance with an illustrative embodiment.

With reference to FIG. 3, this figure depicts a block diagram of an example partition placement in presently used distributed databases that can be improved in accordance with an illustrative embodiment. An example cluster of nodes is depicted in which primary and replica partitions of a distributed database are hosted and operated. The cluster includes seven example nodes, similar to data processing system 106 in FIG. 1.

The seven nodes are labeled nodes 0, 1, 2, 3, 4, 5, and 6. A primary partition has a label that begins with letter "P" and has a number. For example, partitions P0, P1, P2, P3, P4, P5, P6, P7, P8, P9, P10, P11, P12, P13, P14, P15, P16, P17, P18, P19, and P20 are twenty one example primary partitions of the distributed database.

Only as a non-limiting example, each primary has two replicas. Only for the clarity of the description and without implying any particular ranking, order, or priority therefrom, the replicas as labeled secondary and tertiary replicas.

A secondary replica has a label that begins with letter "S" and has a number that is the same as the number of the corresponding primary. For example, replica S0 is a secondary replica of primary P0. In a like manner replicas S0, S1, S2, S3, S4, S5, S6, S7, S8, S9, S10, S11, S12, S13, S14, S15, S16, S17, S18, S19, and S20 are twenty one example secondary replicas of the twenty one corresponding primary partitions described earlier A tertiary replica has a label that begins with letter "T" and has a number that is the same as the number of the corresponding primary. For example, replica T0 is a tertiary replica of primary P0. In a like manner replicas T0, T1, T2, T3, T4, T5, T6, T7, T8, T9, T10, T11, T12, T13, T14, T15, T16, T17, T18, T19, and T20 are twenty one example tertiary replicas of the twenty one corresponding primary partitions described earlier Configuration 302 depicts an initial placement of the partitions across the seven nodes. For example, P0, P1, P2 are placed on node 0 with corresponding S0, S1, S2 on node 1, and T0, T1, T2 on node 2. Other primaries and replicas are distributed as shown.

Configuration 304 represents a state of migration and recovery after a failure or removal of node 0. S0 in node 1 is promoted to P0 in node 1, S1 in node 1 is promoted to P1 in node 1, and S2 in node 1 is promoted to P2 in node 1.

Now, node 1 is operating six primaries—P0-P2 due to the failure of node 0, and P3-P5 that were already on node 1.

As can be seen, the demand on the computing resources of node 1 has increased significantly, perhaps double or more depending upon the partitions. As can also be seen the other nodes—nodes 2-6 are not sharing any load increase from the failure of node 0. This manner of operating node 1 causes a significant reduction in the performance of node 1. When the overall performance of the database is measured by the worst performing node, it is evident that the overall performance of the database has suffered significantly in configuration 304.

Configuration 306 shows the restoration of the original redundancy after the failure of node 0. Node 0 was hosting T15-17 and S18-20 as well. Those replicas have to be migrated to some other active node as well to restore the redundancies of P15-20. Furthermore, because S0-S2 have been promoted to P0-P2, new S0-S2 are also needed so that P0-P2 can each have two replicas again. In the depicted example, T0-T2 at node 2 from configuration 304 are made secondary in configuration 306, and new T0-T2 are created in node 3 in configuration 306. Similar renumbering and migration of T15-17 and S18-S20 occurs as shown in configuration 306.

As can be seen, node 1 is not only executing six primary partitions, it is also storing more replicas. The demand on the storage devices of node 1, node 2, and node 3 has increased, whereas the demand on the storage devices of nodes 4-6 is unaffected by the failure in configuration 304. This uneven consumption of computing resources, such as storage, makes certain nodes, e.g., nodes 1-3, more critical than nodes 4-6 in case of future failures.

Figure 4:
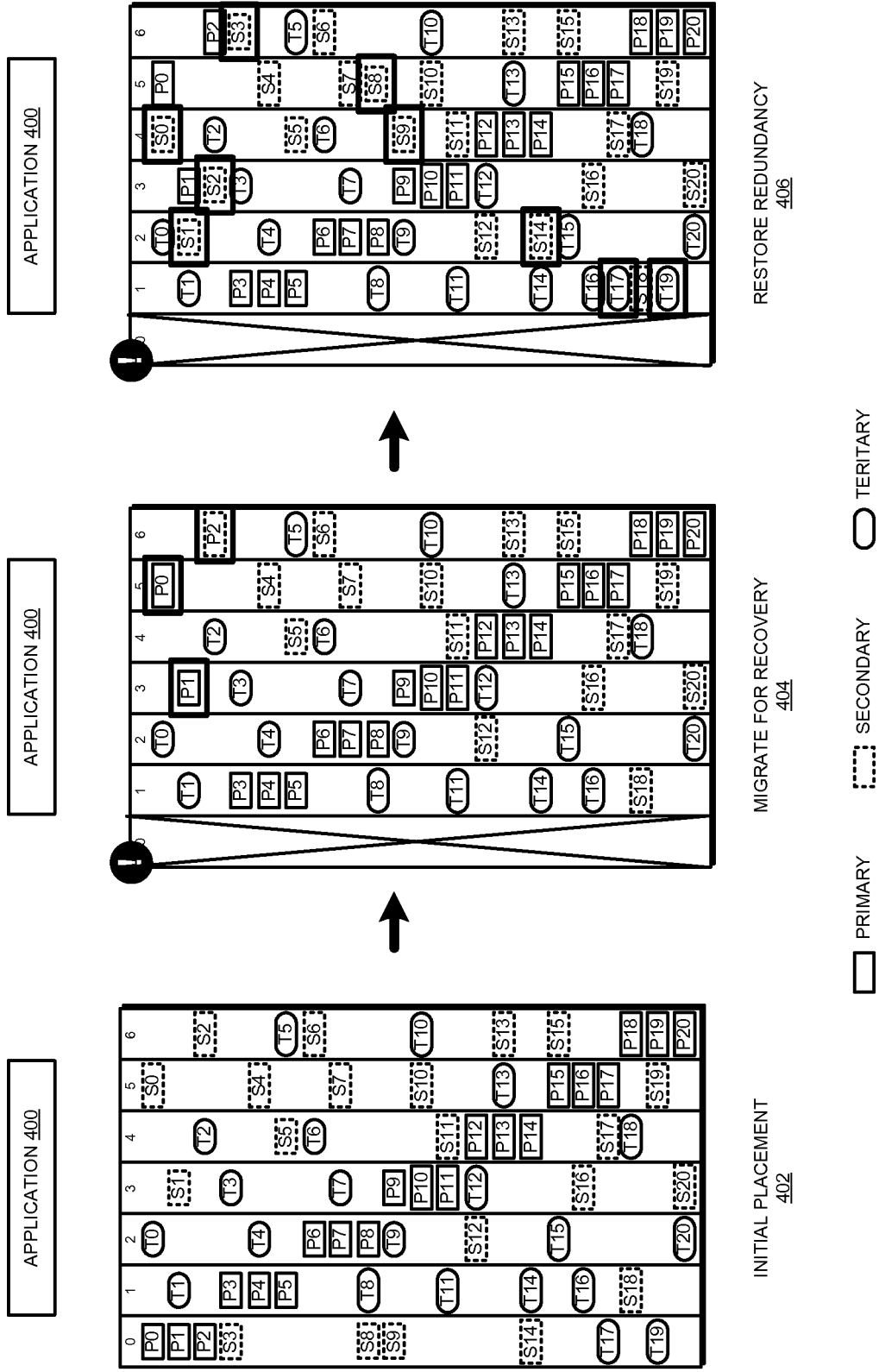
FIG. 4 depicts a block diagram of an example partition placement for distributed databases in accordance with an illustrative embodiment.

With reference to FIG. 4, this figure depicts a block diagram of an example partition placement for distributed databases in accordance with an illustrative embodiment. Application 400 is an example of application 105 in FIG. 1. In the depicted example, application 400 is shown to execute outside the nodes used for hosting or serving the distributed database. For example, application 400 can be regarded as executing in an administration server (not shown) of the distributed database.

In the manner of the cluster of nodes described in FIG. 3, an example cluster of nodes is depicted in which primary and replica partitions of a distributed database are hosted and operated in accordance with an embodiment. The cluster includes seven example nodes, similar to data processing system 104 or 106 in FIG. 1.

The seven nodes are labeled nodes 0, 1, 2, 3, 4, 5, and 6. As an example, partitions P0, P1, P2, P3, P4, P5, P6, P7, P8, P9, P10, P11, P12, P13, P14, P1, P16, P17, P18, P19, and P20 are twenty one example primary partitions of the distributed database.

Again, only as a non-limiting example, each primary has two replicas. Only for the clarity of the description and without implying any particular ranking, order, or priority therefrom, the replicas as labeled secondary and tertiary replicas. For example, replicas S0, S1, S2, S3, S4, S5, S6, S7, S8, S9, S10, S11, S12, S13, S14, S1, S16, S17, S18, S19, and S20 are twenty one example secondary replicas and replicas T0, T1, T2, T3, T4, T5, T6, T7, T8, T9, T10, T11, T12, T13, T14, T1, T16, T17, T18, T19, and T20 are twenty one tertiary replicas of the twenty one corresponding primary partitions described earlier Configuration 402 depicts an initial placement of the partitions across the seven nodes. For example, P0, P1, P2 are co-resident on node 0. S0, S1, and S2 are distributed according to one or more conditions described herein to nodes 5, 3, and 6, respectively. Similarly, according to one or more conditions described herein, T0, T1, T2 are distributed to nodes 2, 1, and 4, respectively. Other primaries and replicas are distributed as shown.

As one example condition on the placement, application 400 ascertains that a replica is placed on a node other than the node where the primary is placed. As another example condition on the placement, application 400 ascertains that different replicas are placed on different nodes. As another example condition on the placement, application 400 ascertains that the placement of a copy (whether a primary or a replica) on a node does not cause a utilization of that node to exceed a threshold utilization set for that node. As another example condition on the placement, application 400 ascertains that when a copy (whether primary or a replica) can be placed on any of the several alternative nodes, the copy is placed on that alternative node whose utilization will increase by the least amount as a result of the placement while maintaining that node's reserves requirements.

As another example condition on the placement, application 400 ascertains that when two or more primaries are co-resident or co-hosted on a common node, their replicas are not also co-resident on another node, if possible, given the nodes in the configuration. When the node availability in a given configuration necessitates that some replicas of co-resident primaries have to be co-resident at another node, the condition ascertains that a number of co-resident replicas of the co-resident primaries is minimized in the configuration.

Configuration 404 represents a state of migration and recovery achieved using application 400 after a failure or removal of node 0. As an example, when a node that was hosting a primary fails, application 400 selects a replica of the primary that should be activated on another node according to one or more conditions. For example, when several replicas corresponding to the failed primary are available for activation, application 400 ascertains that the replica, which causes the least increase in utilization of its node while maintaining that node's reserves requirements, is activated.

In the depicted example, application 400 evaluates the one or more conditions and promotes S0 in node 5 to P0 in node 5, promotes S1 in node 3 to P1 in node 1, and promotes S2 in node 6 to P2 in node 6. Now, no single node, unlike node 1 in configuration 304 in FIG. 3, is taking over a disproportional load of the failed primaries P0-P2 due to the failure of node 0. The load distribution during migration results from judicious distribution of the replicas by application 400.

This manner of operating the nodes does not cause any one node to experience significant reduction in the performance. When the overall performance of the database is measured by the worst performing node, the overall performance of the database does not suffer as badly as in configuration 304 in FIG. 3.

Configuration 406 shows the restoration of the original redundancy by application 400 after the failure of node 0. Node 0 was hosting S3, S8, S9, S14, T17, and T19 as well. Application 400 migrates those replicas to other active node as well according to one or more conditions described herein, to restore the redundancies of P3, P8, P9, P14, P17, and P19. Furthermore, because S0-S2 have been promoted to P0-P2 in various nodes, new S0-S2 are also needed so that P0-P2 can each have two replicas again.

For example, application 400 evaluates a set of conditions that should be satisfied for changing the placing of replicas on various nodes. As an example, application 400 ascertains that when a replica can be placed on any of the several alternative nodes, the replica is placed on that alternative node whose utilization will increase by the least amount as a result of the placement while maintaining that node's capacity limitations. The new configuration continues to satisfy the original set of conditions so that in the event of a secondary failure, partial node failure, or expansion, the system can easily be reconfigured to have a balanced distribution with minimal additional I/O.

As can be seen, in performing this manner of distributing and placing of the replicas on various nodes, application 400 causes a balanced increase of utilization and consumption of resources at various nodes. Thus, the demand on the storage devices of the nodes used for migrating the replicas increases in a more balanced manner as compared to the increase in the demand in configuration 306 in FIG. 3. This balanced consumption of computing resources, such as storage, avoids or mitigates making certain nodes more critical than other nodes in case of future failures.

Figure 5:
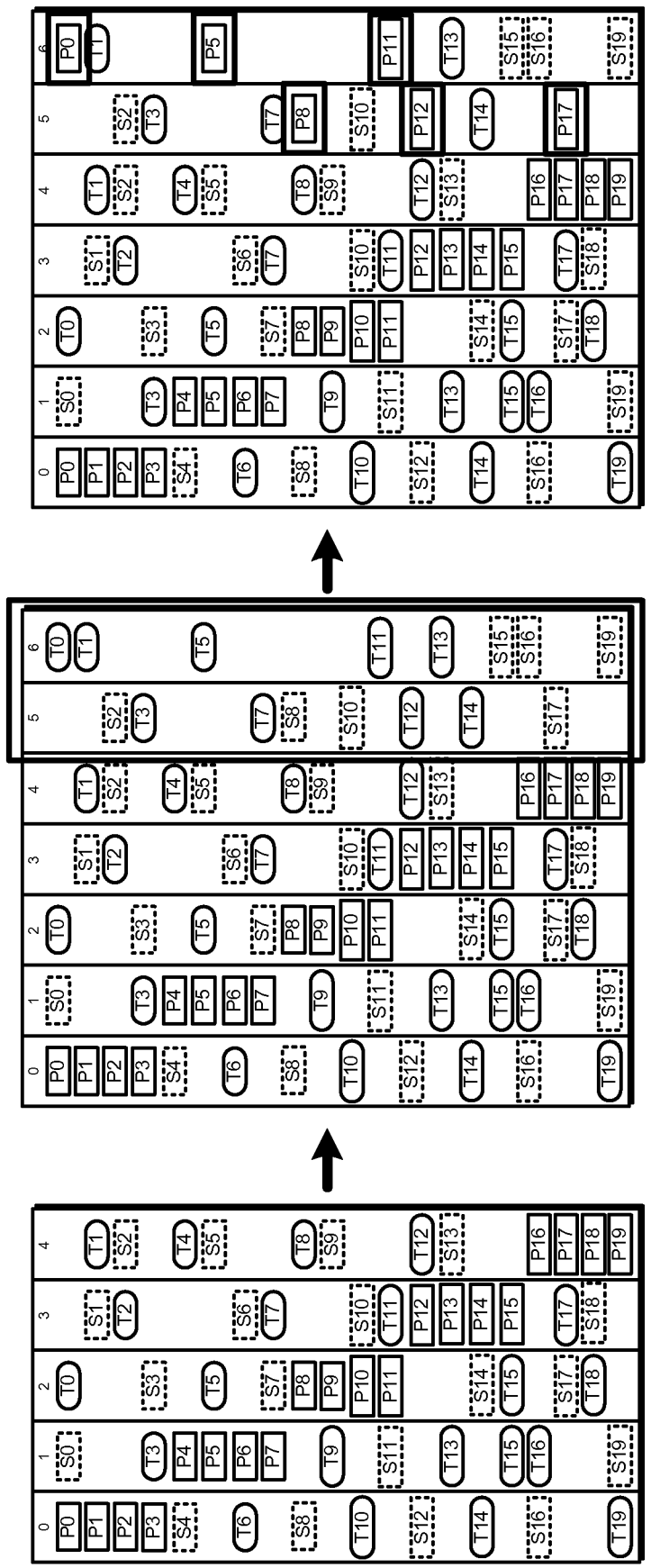
FIG. 5 depicts a block diagram of an example partition placement for distributed databases during expansion in accordance with an illustrative embodiment.

With reference to FIG. 5, this figure depicts a block diagram of an example partition placement for distributed databases during expansion in accordance with an illustrative embodiment. Application 500 is an example of application 400 in FIG. 1. In the depicted example, application 500 is shown to execute outside the nodes used for hosting or serving the distributed database. For example, application 500 can be regarded as executing in an administration server (not shown) of the distributed database.

In the manner of the cluster of nodes described in FIG. 3, an example cluster of nodes is depicted in which primary and replica partitions of a distributed database are hosted and operated in accordance with an embodiment. The cluster initially includes five example nodes in configuration 502. Configuration 502 is expanded to include seven example nodes in configurations 504 and 506. A node in any of the depicted configurations is similar to data processing system 104 or 106 in FIG. 1. Node and partition labeling follows the same labeling notation as has been described with respect to FIGS. 3 and 4.

Configuration 502 depicts an initial placement of the partitions across the five initial nodes—nodes 0, 1, 2, 3, 4. For example, P0, P1, P2, P3 are co-resident on node 0. S0, S1, S2, and S3 are distributed according to one or more conditions described herein to nodes 1, 3, 4, and 2, respectively. Similarly, according to one or more conditions described herein, T0, T1, T2, T3 are distributed to nodes 2, 4, 3, and 1, respectively. Other primaries and replicas are distributed as shown.

Configuration 504 represents a first step of expansion using application 500 after nodes 5 and 6 are added to the configuration 502. Application 500 applies a set of conditions to perform a redistribution of partitions from the five existing nodes of configuration 502 to the seven nodes now in configuration 504.

As an example, application 500 ascertains that when a primary can be placed on any of the several alternative nodes, the copy is placed on that alternative node whose utilization will increase by the least amount as a result of the placement while maintaining that node's reserves requirements. As another example, application 500 ascertains that a primary is either moved from an existing node to the new node or not moved at all, disallowing any moves of a primary from one existing node to another existing node. Such a restriction minimizes I/O over a data network, which is expensive.

In compliance with these and other similarly purposed conditions, application 500 creates, as a first step in the expansion process, replicas—secondary and/or tertiary—of certain partitions. Some of these replicas will remain in the replica form and some will be promoted to primaries in the next step.

In the next step, application identifies the primaries that can be migrated to the new nodes in compliance with one or more conditions. For a primary that is to be migrated to a new node, e.g., primary P12 from existing node 3 to new node 5, application 500 changes the state of the newly created replica of the primary on the new node, to promote the replica as the primary. During the creation of the replica on the new node and the promotion of the replica to a primary state, the original primary on the existing node is kept operational to minimize or avoid disruption of service provided by that primary.

Once the replica has been successfully promoted to primary, application 500 demotes the original primary to a replica state. For example, replica 112 in node 5 of configuration 504 is promoted to P12 in node 5, and original P12 in node 3 of configuration 504 is demoted to 112 in node 3 in configuration 506.

Figure 6:
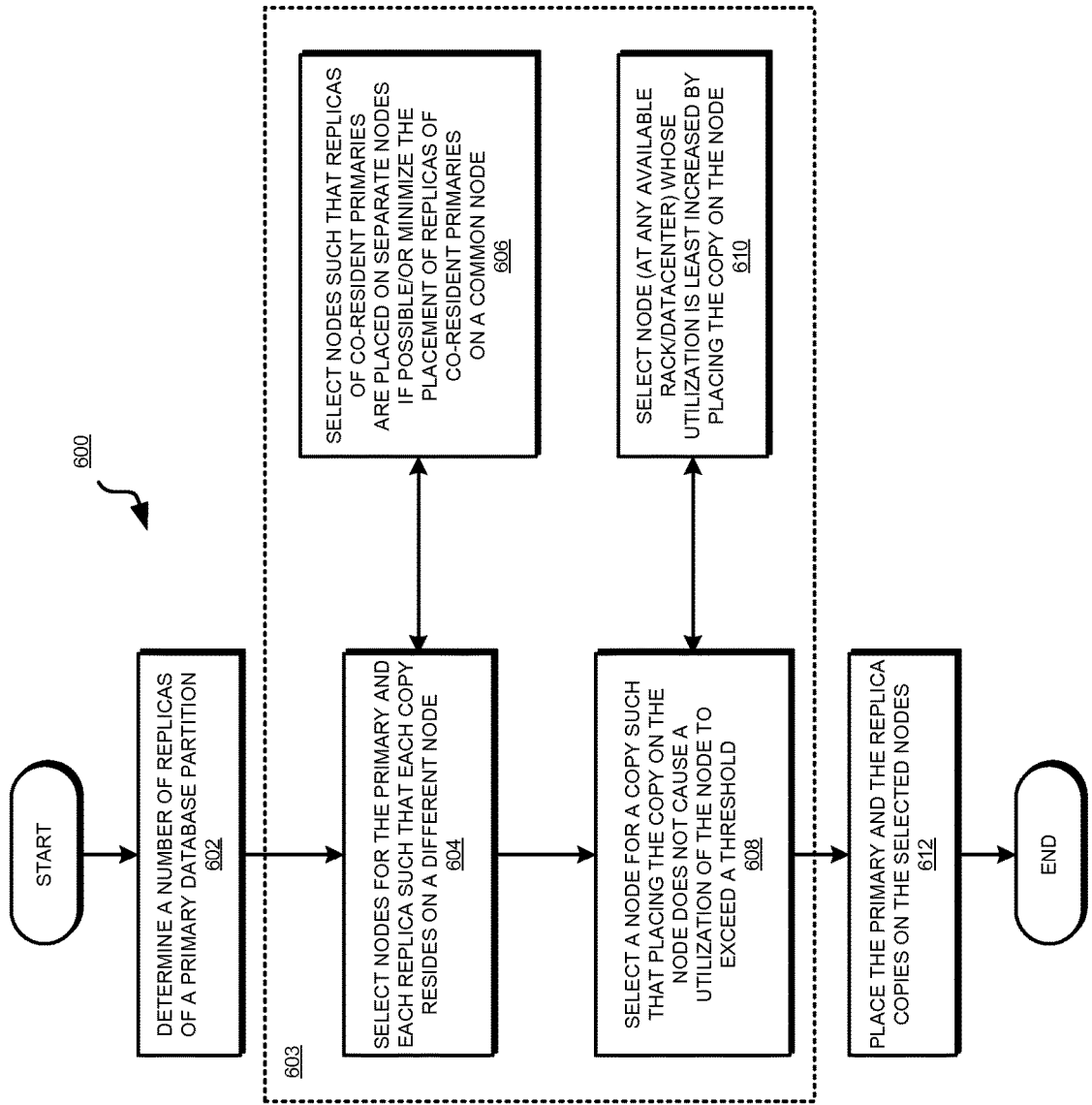
FIG. 6 depicts a flowchart of an example process for balanced partition placement in distributed databases in accordance with an illustrative embodiment.

With reference to FIG. 6, this figure depicts a flowchart of an example process for balanced partition placement in distributed databases in accordance with an illustrative embodiment. Process 600 can be implemented in application 400 of FIG. 4 or application 500 of FIG. 5.

The application determines a number of replicas of each primary partition that are to be maintained in a distributed database (block 602). The application performs the operations of block 603 any number of times, in any suitable order, and as needed in a given distributed database environment. Under certain circumstances the illustrative embodiments contemplate that a step within block 603 may be omitted as well.

Recall that the primary partition and each replica thereof is regarded as a copy of the partition. For example, for a primary, within block 603, the application selects two or more nodes for the primary and each replica such that each copy resides on a different node (block 604). In selecting the nodes, the application selects the nodes such that replicas of co-resident primaries are placed on separate nodes when possible, and that the placement of the replicas of co-resident primaries on a common node is minimized (block 606).

Furthermore, the application ensures that a node for a copy is selected such that the original set of conditions is satisfied and placing the copy on that node does not cause the utilization of that node to exceed a threshold utilization of that node (block 608). As an additional consideration, the application can also select a node whose utilization is least increased by such placement of the copy on the node (block 610).

The application places the primaries and replicas on their respective selected nodes (block 612). The application ends process 600 thereafter.

Note that as depicted, process 400 indicates a greedy approach for making the best decision for one node, without considering whether the decision is optimal or suboptimal in the larger scheme of things where numerous partitions are to be placed. An adaptation of process 400 where a decision reached for placing a partition on a node according to the depicted process 400 is fixed or put on hold while placements decisions for one or more other partitions are similarly computed. The decision making process for the various partitions may be repeated, in different order of the partitions, before arriving at a solution configuration which minimizes utilization and minimizes co-located copies of co-resident partitions across several nodes and several partitions.

Figure 7:
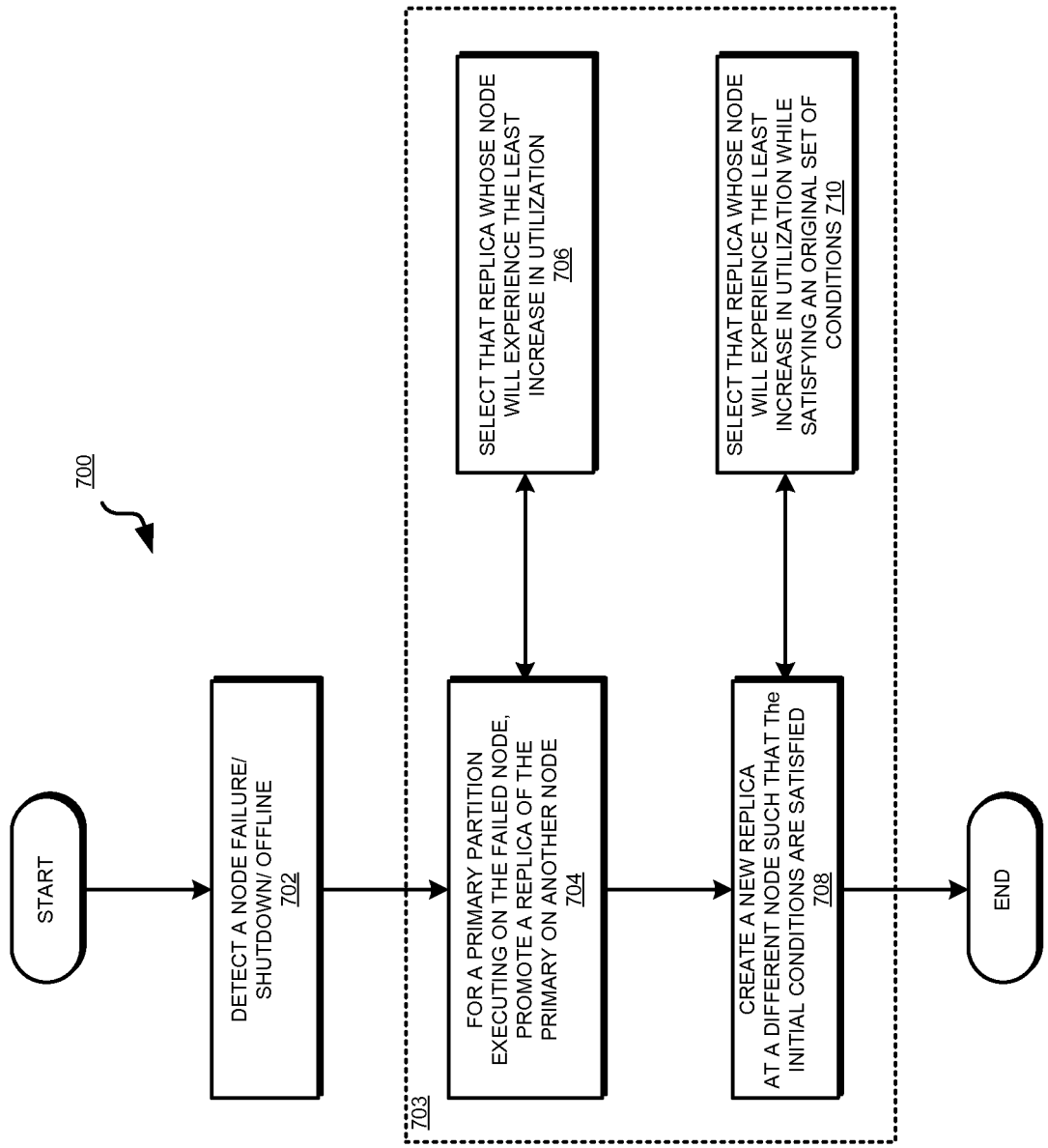
FIG. 7 depicts a flowchart of an example process for balanced partition placement in distributed databases during a recovery operation in accordance with an illustrative embodiment.

With reference to FIG. 7, this figure depicts a flowchart of an example process for balanced partition placement in distributed databases during a recovery operation in accordance with an illustrative embodiment. Process 700 can be implemented in application 400 of FIG. 4 or application 500 of FIG. 5.

The application detects a node failure or shutdown in a distributed database (block 702). The application performs the operations of block 703 any number of times, in any suitable order, and as needed in a given distributed database environment. Under certain circumstances the illustrative embodiments contemplate that a step within block 703 may be omitted as well.

For example, for a primary on the failed node, within block 703, the application promotes a corresponding replica on a different node (block 704). To promote, the application selects that replica whose activation or promotion will cause the least increase in the corresponding node's utilization (block 706).

Furthermore, the application creates a new replica at a different node using the placement principles and conditions described earlier (block 708). To create the new replica, the application selects that node whose utilization will be least increased from placing the new replica thereon (block 710). The application ends process 600 thereafter.

Figure 8:
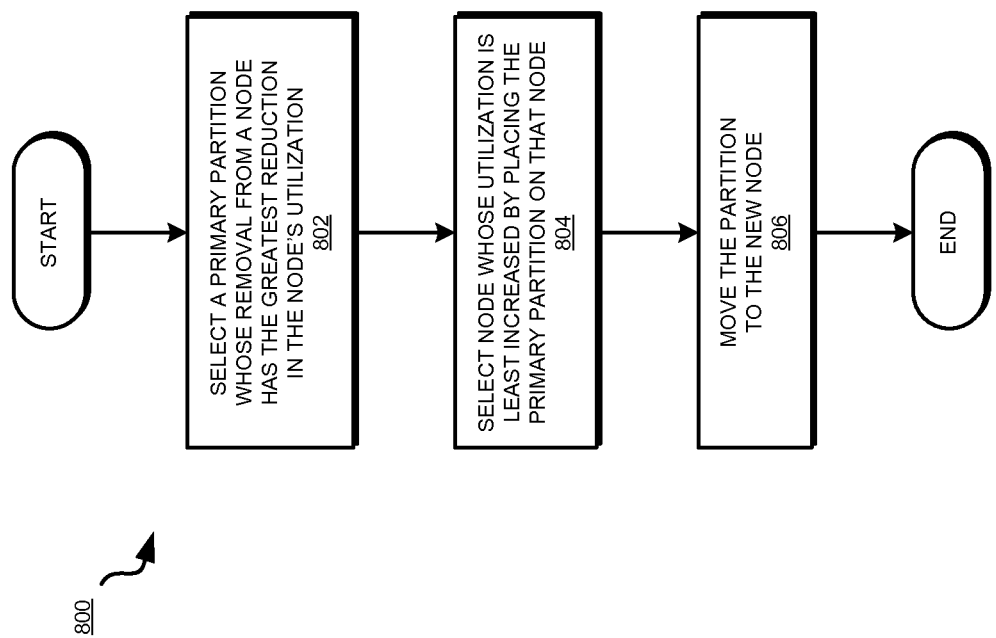
FIG. 8 depicts a flowchart of an example process for balanced partition placement in distributed databases during a redistribution operation in accordance with an illustrative embodiment.

With reference to FIG. 8, this figure depicts a flowchart of an example process for balanced partition placement in distributed databases during a redistribution operation in accordance with an illustrative embodiment. Process 800 can be implemented in application 400 of FIG. 4 or application 500 of FIG. 5.

The application selects a primary whose removal from a source node has the greatest reduction in the source node's utilization (block 802). The application selects a target node whose utilization is least increased by placing the primary on the target node (block 804). The application moves the primary from the source node to the target node (block 806). The application ends process 800 thereafter.

Figure 9:
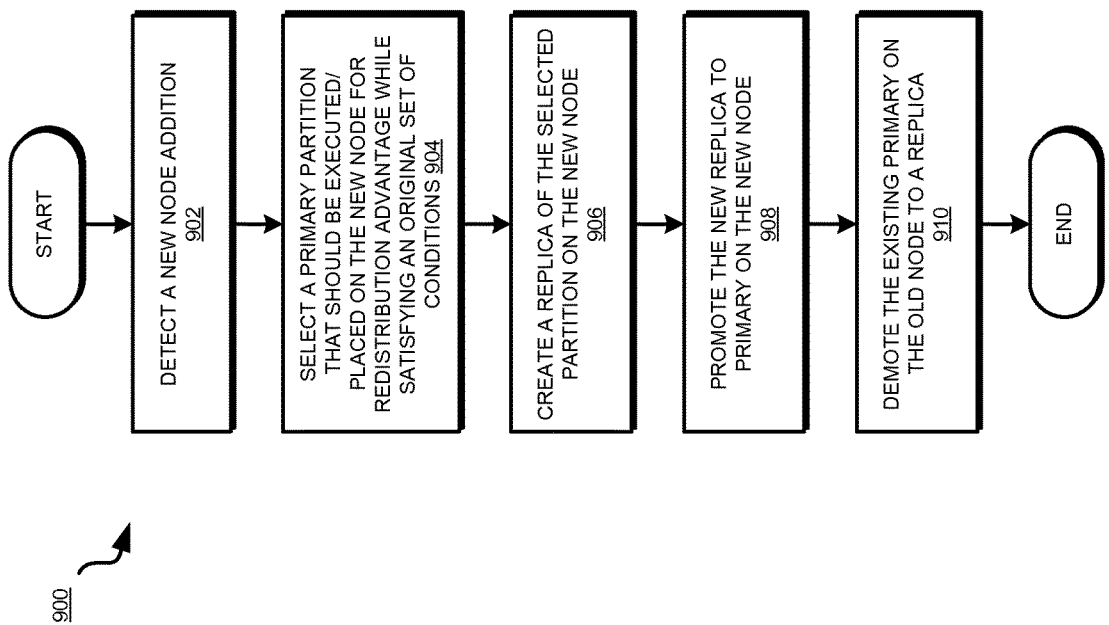
FIG. 9 depicts a flowchart of an example process for balanced partition placement in distributed databases during an expansion operation in accordance with an illustrative embodiment.

With reference to FIG. 9, this figure depicts a flowchart of an example process for balanced partition placement in distributed databases during an expansion operation in accordance with an illustrative embodiment. Process 900 can be implemented in application 400 of FIG. 4 or application 500 of FIG. 5.

The application detects an addition of a new node (block 902). The application selects a primary that should be placed on the new node, such as to achieve some advantage from the added node (block 904).

The application creates a replica of that primary on the new node (block 906). The application promotes the replica on the new node to a primary (block 908). The application demotes the original primary at its original node to a replica (block 910) or disregards the primary or an existing copy, so that the total number of replicas is as before. The application ends process 900 thereafter. The choice of which replica is moved is determined not only by the individual gains made by moving that partition but by overall gains of moving any partition to any node.

Thus, a computer implemented method, system or apparatus, and computer program product are provided in the illustrative embodiments for balanced partition placement in distributed databases. Where an embodiment or a portion thereof is described with respect to a type of device, the computer implemented method, system or apparatus, the computer program product, or a portion thereof, are adapted or configured for use with a suitable and comparable manifestation of that type of device.

The illustrative embodiments are described with respect to nodes, node additions, and node failures only as non-limiting examples. Principles of an embodiment can be adapted for partial failures of a node, such as a failure of a storage device at a node. For example, just as a database is partitioned, replicas of partitions are created, and the various copies are placed and migrated, the data of a partition can be divided, distributed to different storage devices across one or more nodes. By distributing the data across storage devices in the manner of an embodiment, a failure or addition of a storage device triggers a similar rebalancing of data distribution without disruption of service.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for balanced partition placement in a distributed database, the method comprising:
    identifying, at an application executing using a processor and a memory, a first node in a set of nodes for storing a first primary partition of the distributed database and a second node in the set of nodes for storing a first replica of the first primary partition, wherein:
        the first node and the second node are different nodes in the set of nodes;
        the second node does not include any replicas of a primary partition different from the first primary partition, when the first node includes the primary partition different from the first primary partition; and
        the first primary partition being placed on the first node does not cause a storage utilization of the first node to exceed a first utilization threshold, wherein the first utilization threshold is based on a resource reserve requirement of the first node, wherein the storage utilization comprises storage resource utilization at a node, and wherein the resource reserve requirement indicates a threshold amount of node resources that is available for operations executed at the node;
    placing the first primary partition on the first node and the first replica of the first primary partition on the second node;
    determining that a replica of a primary partition different from the first primary partition is collocated with the first replica of the first primary partition on the second node; and
    placing the primary partition different from the first primary partition on a third node to avoid collocating the primary partition different from the first primary partition and the first primary partition.

2. The method of claim 1, wherein identifying the first node further comprises:
    determining whether the first primary partition being placed on the first node causes the storage utilization of the first node to exceed the first utilization threshold, wherein the identifying the first node is responsive to the determining being negative.

3. The method of claim 1, wherein identifying the first node further comprises:
    determining that the first primary partition can be placed on the first node or a third node in the set of nodes;
    computing a first increase in the storage utilization of the first node from the first primary partition being placed on the first node;
    computing a second increase in a storage utilization of the third node from the first primary partition being placed on the third node; and
    identifying the first node for the first primary partition responsive to the first increase being less than the second increase.

4. The method of claim 1, further comprising:
    detecting that the first node is inoperational;

designating the first replica in the second node as the first primary partition; and creating a second replica of the first primary partition at a third node.

5. The method of claim 4, further comprising:
determining that the first primary partition has a third replica hosted at a third node;
computing a first increase in a storage utilization of the second node from designating the first replica as the first primary partition on the second node;
computing a second increase in a storage utilization of the third node from designating the third replica as the first primary partition on the third node; and
selecting the first replica for the designating responsive to the first increase being less than the second increase.

6. The method of claim 4, further comprising:
determining that the third node and a fourth node are both eligible for hosting the second replica;
computing a first increase in a storage utilization of the third node from placing the second replica on the third node;
computing a second increase in a storage utilization of the fourth node from placing the second replica on the fourth node; and
selecting the third node for placing the second replica responsive to the first increase being less than the second increase, and wherein placing the second replica on the third node does not violate a total capacity limitation of the third node.

7. The method of claim 1, further comprising:
detecting that a new node has been added to the set of nodes;
selecting the first primary partition from the first node for migration to the new node;
creating a second replica of the first primary partition on the new node; and
promoting the second replica as the first primary partition on the new node.

8. The method of claim 1, further comprising:
partitioning the distributed database into a plurality of primary partitions, the plurality of primary partitions including the first primary partition;
determining a numerosity of replicas that are to be maintained for each primary partition in the plurality of primary partitions; and
creating, for the first primary partition, replicas in the determined numerosity, the replicas including the first replica.

9. A computer usable program product comprising a nontransitory computer readable storage device including computer usable code for balanced partition placement in a distributed database, the computer usable code comprising:
computer usable code for identifying, at an application executing using a processor and a memory, a first node in a set of nodes for storing a first primary partition of the distributed database and a second node in the set of nodes for storing a first replica of the first primary partition, wherein:
the first node and the second node are different nodes in the set of nodes;
the second node does not include any replicas of a primary partition different from the first primary partition, when the first node includes the primary partition different from the first primary partition; and
the first primary partition being placed on the first node does not cause a storage utilization of the first node to exceed a first utilization threshold, wherein the first utilization threshold is based on a resource reserve requirement of the first node, wherein the storage utilization comprises storage resource utilization at a node, and wherein the resource reserve requirement indicates a threshold amount of node resources that is available for operations executed at the node;

computer usable code for placing the first primary partition on the first node and the first replica of the first primary partition on the second node;
computer usable code for determining that a replica of a primary partition different from the first primary partition is collocated with the first replica of the first primary partition on the second node; and
computer usable code for placing the primary partition different from the first primary partition on a third node to avoid collocating the primary partition different from the first primary partition and the first primary partition.

10. The computer usable program product of claim 9, wherein identifying the first node further comprises:
computer usable code for determining whether the first primary partition being placed on the first node causes the storage utilization of the first node to exceed the first utilization threshold, wherein the identifying the first node is responsive to the determining being negative.

11. The computer usable program product of claim 9, wherein identifying the first node further comprises:
computer usable code for determining that the first primary partition can be placed on the first node or a third node in the set of nodes;
computer usable code for computing a first increase in the storage utilization of the first node from the first primary partition being placed on the first node;
computer usable code for computing a second increase in a storage utilization of the third node from the first primary partition being placed on the third node; and
computer usable code for identifying the first node for the first primary partition responsive to the first increase being less than the second increase.

12. The computer usable program product of claim 9, further comprising:
computer usable code for detecting that the first node is inoperational;
computer usable code for designating the first replica in the second node as the first primary partition; and
computer usable code for creating a second replica of the first primary partition at a third node.

13. The computer usable program product of claim 12, further comprising:
computer usable code for determining that the first primary partition has a third replica hosted at a third node;
computer usable code for computing a first increase in a storage utilization of the second node from designating the first replica as the first primary partition on the second node;
computer usable code for computing a second increase in a storage utilization of the third node from designating the third replica as the first primary partition on the third node; and
computer usable code for selecting the first replica for the designating responsive to the first increase being less than the second increase.

14. The computer usable program product of claim 12, further comprising:

computer usable code for determining that the third node and a fourth node are both eligible for hosting the second replica;

computer usable code for computing a first increase in a storage utilization of the third node from placing the second replica on the third node;

computer usable code for computing a second increase in a storage utilization of the fourth node from placing the second replica on the fourth node; and computer usable code for selecting the third node for placing the second replica responsive to the first increase being less than the second increase, and wherein placing the second replica on the third node does not violate a total capacity limitation of the third node.

15. The computer usable program product of claim 9, wherein the computer usable code is stored in a computer readable storage device in a data processing system, and wherein the computer usable code is transferred over a network from a remote data processing system.

16. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

17. A data processing system for balanced partition placement in a distributed database, the data processing system comprising:

a storage device, wherein the storage device stores computer usable program code; and a processor, wherein the processor executes the computer usable program code, and wherein the computer usable program code comprises:

computer usable code for identifying, at an application executing using a processor and a memory, a first node in a set of nodes for storing a first primary partition of the distributed database and a second node in the set of nodes for storing a first replica of the first primary partition, wherein:

the first node and the second node are different nodes in the set of nodes;

the second node does not include any replicas of a primary partition different from the first primary partition, when the first node includes the primary partition different from the first primary partition; and the first primary partition being placed on the first node does not cause a storage utilization of the first node to exceed a first utilization threshold, wherein the first utilization threshold is based on a resource reserve requirement of the first node, wherein the storage utilization comprises storage resource utilization at a node, and wherein the resource reserve requirement indicates a threshold amount of node resources that is available for operations executed at the node;

computer usable code for placing the first primary partition on the first node and the first replica of the first primary partition on the second node;

computer usable code for determining that a replica of a primary partition different from the first primary partition is collocated with the first replica of the first primary partition on the second node; and computer usable code for placing the primary partition different from the first primary partition on a third node to avoid collocating the primary partition different from the first primary partition and the first primary partition.

* * * * *